(12) United States Patent
Faesch (10) Patent No.: US 6,658,942 B1
(45) Date of Patent: Dec. 9, 2003

(54) METHOD AND DEVICE FOR MEASURING A TORQUE EXERTED ON A PART SUBJECTED TO TORQUE AND BENDING LOADS

(75) Inventor: Gérard Faesch, Mulhouse (FR)

(73) Assignee: Newtech Mecatronic Inc., Blainville (CA)

( * ) Notice: Subject to any disclaimer, the term of this patent is extended or adjusted under 35 U.S.C. 154(b) by 0 days.

(21) Appl. No.: 09/937,000

(22) PCT Filed: Mar. 17, 2000

(86) PCT No.: PCT/FR00/00674

§ 371 (c)(1),
(2), (4) Date: Jan. 29, 2002

(87) PCT Pub. No.: WO00/57149

PCT Pub. Date: Sep. 28, 2000

(30) Foreign Application Priority Data

Mar. 19, 1999 (FR) .............................. 99 03626

(51) Int. Cl.⁷ .............................. G01B 7/16
(52) U.S. Cl. .............. 73/781; 73/760; 73/862.041
(58) Field of Search ............ 73/862.041, 862.042, 73/862.043, 862.044, 862, 781, 760, 782, 862.333, 862.334, 862.337, 862.338

(56) References Cited

U.S. PATENT DOCUMENTS 4,664,785 A * 5/1987 Devos et al. ............... 208/354
4,941,363 A * 7/1990 Doemens et al. ...... 73/862.337
5,546,817 A * 8/1996 Heiman ................. 73/862.333

* cited by examiner

Primary Examiner—Edward Lefkowitz
Assistant Examiner—Alandra Ellington
(74) Attorney, Agent, or Firm—Ogilvy Renault; Robert Mitchell (57) ABSTRACT

The invention concerns a method and a device for measuring a torque. The measuring method is characterized in that it consists in fixing on said part (1) at least two identical sensors (2) for measuring deformation, directly mounted between two separate anchoring points (A, B) and positioned on two curves (a) of the part (1) sloping at an angle a relative to the part (1) axis. Said sensors are designed to deliver electric signals based on modifications in distance between their respective anchoring points generated by said deformation.

10 Claims, 7 Drawing Sheets

METHOD AND DEVICE FOR MEASURING A TORQUE EXERTED ON A PART SUBJECTED TO TORQUE AND BENDING LOADS

The present invention concerns a procedure to measure at least a component of a force tenser applied to a part, having an axis of symmetry, the force tenser defined as follows in a trigonometric coordinate system:

Fx Fy Fz

Mx My Mz, this procedure requiring fixing at least two identical deformation measurement sensors on said part, each being directly mounted between two distinct anchoring points using fastening members designed to transmit to the sensors deformations of said part, said sensors being designed to deliver electric signals as a function of a change in distance between said respective anchoring points caused by said deformations, proceeding to electrically condition said signals from said sensors, this electrically conditioning being specifically associated with said sensors, and combining these signals to deduct a value of said component of said force tenser.

It also concerns a measurement device to realize the above procedure, each sensor having two contacts spaced apart by a distance equivalent to that defined between the anchoring points and a pretensioned blade mounted at its extremities in said contacts and having at least one sensing element.

This procedure and measurement device are particularly suited for fixed shafts subject to a reaction torque to a breaking torque or a motor torque. They can however be used for rotating shafts, the measurement device being, in this case, associated with a contact or contactless electric transmission means. The shaft to control is not necessarily cylindrical and its cross section not necessarily circular.

In order to improve the maintenance of mechanical equipment in general, it is useful to monitor and control parts subjected to forces, notably by fixing sensors, which permit static or dynamic behavior information to be obtained, on the parts. This can be done, for example, using a measurement of the deformation.

In the case of ground or air vehicle braking, knowledge of wheel shaft deformations permit precise indications of the exerted braking torque to be given, independently from wheel slide or deformation for example. Knowing this braking torque notably permits improvements in braking performance control.

In many applications, a part subject to a torque is also deformed due to bending loads. Very often, these bending loads interfere with torque measurement and it is necessary to eliminate them. More generally, one can wish, during measurements, to keep certain force tensor components as defined above and eliminate others.

Known mechanical deformation sensors vary diversely in nature and performance. Many different technologies can be used to measure torque. However, few permit torque measurement with a simple and inexpensive device that can be easily fixed to a part to monitor without requiring additional instrumentation assemblies.

Indeed, instrumentation of the part to be monitored can be done by directly fixing strain gauges to the part, choosing the number of strain gauges, their locations and directions, as described in numerous mechanical deformation instrumentation manuals. These installations, are very costly, difficult and impossible to achieve outside specialized shops or laboratories having highly qualified personnel. Attempts are often made to avoid these difficulties by equipping sensor proof bodies with deformation gauges, which are then inserted between two elements of the piece to monitor. In this case for example, with test cell torque meters which are inserted between the motor and driven shafts in a power transmission installation.

This is also the case for many devices such as those described in the publications DE-A-3 406 059 and 3 405 168 or EP-A-0 410 133. These devices remain costly and specific and require the test part to be modified and as such are sometimes impossible to install, since the modifications required are too great. A number of these devices must be cleaned of the interferences (bench-mounted torque meters).

On the other hand, the publication U.S. Pat. No. 3,780,817 describes a sensor limited to bending load measurement and comprised of a pretensioned flexible blade mounted between two fixed contacts, the blade having strain gauges thereon. Its major inconvenience resides in the fact that it is not adjustable, as the fixation points are permanently fixed. Therefore it is not possible to preload the sensor before or during use, in order to achieve a predetermined operation point. In the publication U.S. Pat. No. 5,585,572, the torsion sensor disclosed is very complex and cumbersome. It requires a very costly implementation and cannot be used on shafts to which there is limited access, which cannot be disassembled or which are not cylindrical.

Other devices use a variation in capacitance of a deformable air gap, or an optical measurement system. They use, in general, the rotation of adjacent sections and measure a variation in length that is representative of the angle. In the assembly described in the publication U.S. Pat. No. 4,941,363 for example, the two plates of the capacitor are mounted on collars clamped to the shaft, the reliability of the clamped collars is very difficult to ensure. Additionally, clamping the collars is impossible if the shaft is not cylindrical. It is very difficult to eliminate all interference constraints. The majority of these devices are, additionally, sensitive to external influences.

Other types of torsion sensors also exist, such as that described in the publication U.S. Pat. No. 5,831,180 which uses magnetostriction. The sensor is limited to torque measurement on a vehicle steering bar, where torsion forces are low and bending moment interferences for example, are almost non-existent. This sensor has a complex shape adapted to the geometry of the bar, which does not permit industrial reproducibility at reduced costs. Additionally, its measurement principle is very sensitive to temperature changes, and its engagement on the shaft does not permit any adjustability. The measurement principle based on using two sensors which are symmetrical with respect to a plane passing through the axis of the bar does not automatically permit interference effects to be eliminated, as the two sensors are in opposition. This sensor and its measurement procedure are therefore not at all suitable for the particular application of the present invention.

The present invention has for an object to overcome these inconveniences by providing a torque measurement procedure as well as a device for the implementation of this procedure, the device being easily industriallisable and inexpensively reproducible, being very precise, of minimal bulk, capable of being adapted for parts having various shapes, easy to install and disassemble without having to disassemble any surrounding parts, resistant to temperature variations, adjustable once mounted on the and capable of using specific sensors or those available commercially, the sensors being capable of measuring a length deformation without being subjected to significant forces at their mounting points.

This object is achieved by the procedure as defined in the preamble, characterized by the two distinct anchoring points of each sensor on a surface of the part, such that the two lines passing respectively through the two distinct anchoring points of each sensor, reported on the surface of the part are substantially parallel and form a line parallel to the axis of symmetry of the part going through one of the said anchoring points, forming an angle α relative to the axis of symmetry of the part. The angle α between 0 and 90 degrees. Preferably angle α is equal to 45 degrees.

In accordance with the various arrangements of said sensors, they can be disposed diametrically opposite on said part.

The object can also be achieved by the device as defined in the preamble and characterized in that at least one contact comprises regulation means arranged to adjust the pretension on said blade.

This device is advantageous when applied to large parts of limited maneuverability, being part of a complex system that cannot be modified or which requires significant instrumentation.

Each contact preferably comprises a safety jaw having a slot for receiving the corresponding extremity of said pretensioned blade being, fixed in said contact by a location screw. Regulation means can comprise a control screw engaged with at least one safety jaw for adjusting its position in the direction of said pretension blade.

Preferably, the torque instruments comprise anchoring contacts, each anchoring contact comprising a top face, fixed jointly to a sensor contact and a bottom face having a shape adapted to conform to said part and being fixed jointly thereto.

The contact can be fixed to the anchoring contact corresponding to the removable fixation medium and the anchoring contact can be fixed to said part using a fixation means chosen from along gluing, welding, screwing, and molding.

Preferably, the anchoring contacts are composed of a rigid non-shrinking material, such as a metal or metal alloy.

According to the characteristics of said sensors on the part, the calculator is chosen from among an adder and a subtractor, either digital or analog.

The principle advantage of the method according to the present invention are that it is capable of providing precise and reliable information relating to the torque exerted on a part, using a minimum number of sensors, notably two, while automatically eliminating interfering forces even if they are of significant size, automatically compensating for any eventual dilations due to temperature variations, and using a simple conditioning circuitry arranged near the sensors and having a simple analog or digital processor.

Further characteristics and advantages of the present invention will become apparent in the description which follows a preferred embodiment and its variants, taken in combination with the appended drawings given as non-limiting examples, in which.

Figures 1, 2A, 2B, 2C:
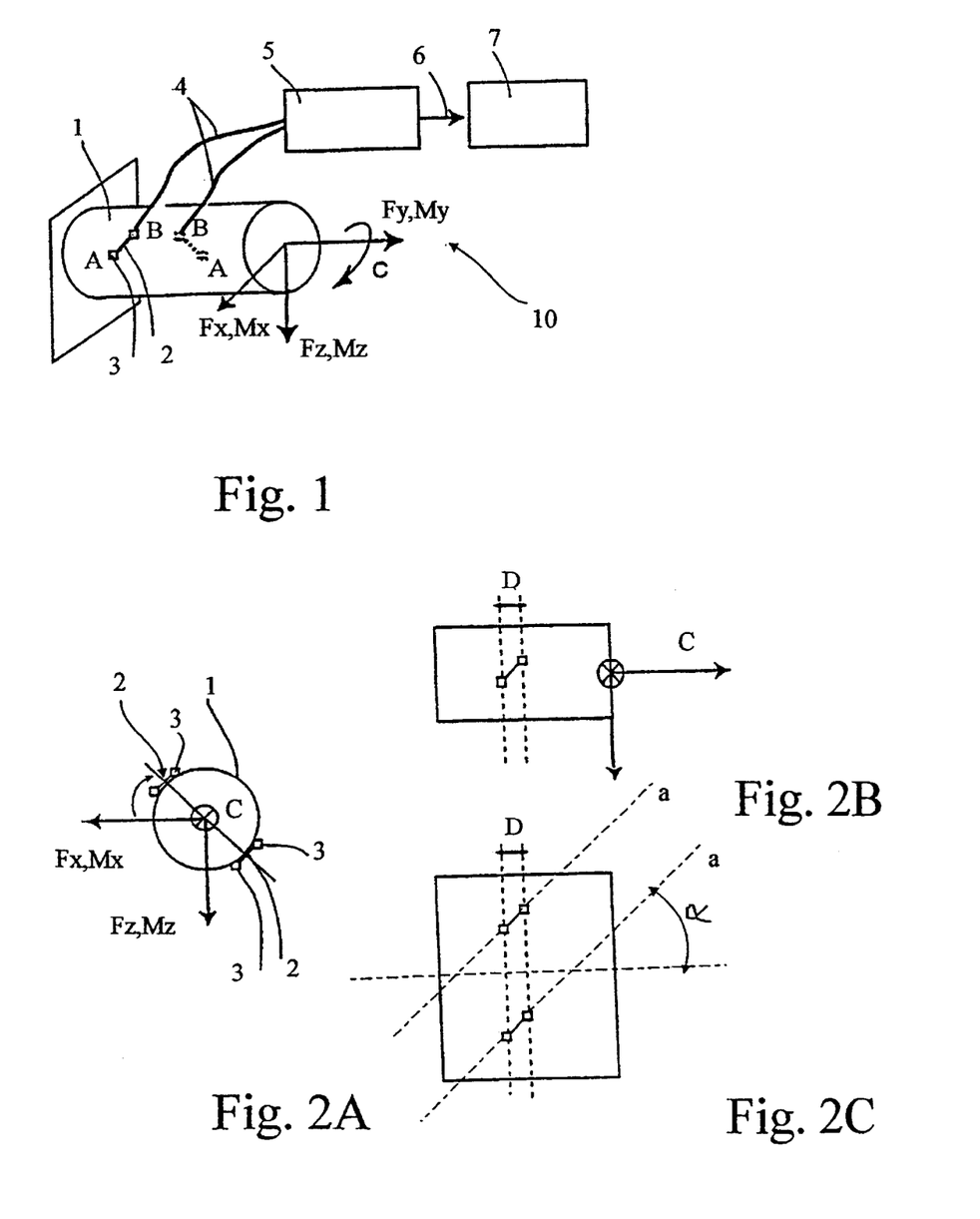
FIG. 1, and FIG. 2A through 2C, show basic schematic views of the method and device of the invention.

FIG. 1 schematically shows a complete torque measurement device 10 according to the invention. A mechanical part 1 is subject to bending forces Fx and Fz associated with their moments Mx and Mz and to a torsional moment My associated with force Fy. Consequently, the force tensor of such a system is defined as follows in a trigonometric coordinate system:

Fx Fy Fz

Mx My Mz

Part 1 is instrumented with two identical sensors 2, fixed to the mechanical structure under study of said part by fastening members 3 and arranged to provide electrical signals as a function of the eventual deformations in said structure. The sensors 2 are linked by electrical wires 4 which transfer said signals to a signal conditioner 5. These signals are then sent via a transmitter 6 to a calculator 7 which, after digitally combining these signals, outputs an indication of the torque applied to said mechanical part 1. This combination of signals can be also achieved in the signal conditioner 5 itself, in an analog form, or in the calculator 7 in a digital form.

The part 1 can be a shaft having a circular or non-circular cross-section, a shaft which links two rotating machines, a wheel shaft of a vehicle (axle of a truck, or railway vehicle, etc.) or can be the aircraft landing gear wheel axle. If the shaft is only subjected to pure torque C, a single sensor 2 is required. No signal isolation is required in this case. Effectively, the components Fx, Fz, Fy, Mx and Mz are equal to zero. The sensor 2, therefore measures only the component My.

If the effects of bending are superimposed to the torsion force C and if force Fy is negligible with respect to the other force tensor components, two sensors 2 diametrically opposite with respect to the axis of the part 1 are fixed to the part (see FIGS. 2A through 2C). FIG. 2A is an end view of the instrumented part 1, the FIG. 2B is a side view of the part and FIG. 2C is a plan view of the instrumented part 1. FIG. 2C clearly shows the two parallel sensors 2 positioned along two curves (a) of part 1 parallel to one another and angled with respect to the axis of part 1 by angle α. The advantage of this configuration is that one of the sensors 2 measures Fx, −Fz, −Mx, Mz and My concurrently, while the second sensor measures −Fx, Fz, Mx, −Mz and My. The combination of both signals produced by the two sensors 2 permits the desired measured component to be obtained. The addition of these obtained signals permits the measurement of My. Subtracting the signals permits an evaluation of Fx, Fz, Mx and Mz to be obtained.

In order to isolate the four forces Fx, Fz, Mx and Mz, additional sensors 2 are required to be fixed to the part 1 under study. Fastening members 3 permit sensors 2 to be fixed to the mechanical part 1. They are rigid and can be screws, pins, tabs, or clamping flanges, for example, but can also comprise glue or weld. These fastening members 3 permit the deformations of the mechanical part 1 to be transmitted to the sensor 2. The material used is such that the deformations of the coupling members 3 themselves are negligible with respect to those of the mechanical part 1. This material can be, for example, a metal, a metal alloy or any other rigid and indeformable material.

The electric signals produced by these sensors 2 are sent to a signal conditioner 5. The conditioner 5 can be completely or partially internal, and even external of the two sensors 2. This would then eliminate any complementary external conditioning. The electrical link 4 is in this case internal within the sensor 2. Only the link through the transmitter 6 exists. This link can take on various forms. In the case of a static shaft, it can be in the form of a wire. In the case of a rotating shaft, the link 6 can be achieved using radio signal, optical signal or receiving dish.

The calculator 7 receives these signals produced by the sensors 2. If the part 1 is only subjected to pure torque C, the calculator 7 is not required, except if the operator wishes to re-scale or change the variables. Otherwise, the calculator 7 permits the isolated measurement of the various torsion and bending forces, by combining the signals produced by the sensors 2. In the case of a part that is perfectly asymmetrical, a simple addition of the signals permits a pure torque result to be deducted whereas subtracting the signals permits the bending forces to be obtained as described above. In this case, the summation of the two signals can be performed directly in the signal conditioner 5.

If part 1 is not perfectly symmetrical, or if the forces are not uniformly distributed, each signal can be weighted and added in order to eliminate the effect of any forces which are not of interest. Generally, the signals are transmitted to the calculator 7 which combines the signals in a digital form.

FIGS. 2A through 2C show a specific installation of the sensors on a part 1 whose behavior and geometry is symmetrical. According to the present invention, two sensors 2 must be fixed diametrically opposite on two parallel curves (a) on the part 1, in an attempt to isolate the bending forces and obtain a measurement of My (torsion), the first component Fy being negligible with respect to the other components of the force tensor. The magnitude of the angle δ can be variable depending on the applications, the quantity and the size of the bending forces which are not required. The distance D permits a torque measurement and adjustment of the measurement range of the sensor 2 for torsion forces applied to the part 1. Indeed, in this manner, the sensor 2 measures the relative behavior of the two curves on the structure of the part 1 in torsion. If the structure or the applied forces are not symmetrical, a model created using finite element analysis is useful in determining the specific locations where the sensors 2 should be positioned, such that the torque C can be isolated from the bending forces. If only a very minor asymmetry exists, the configuration as shown in FIG. 2A can nevertheless be used. However, care must be taken to optimize the angle δ and the distance D in order to obtain the greatest measurement precision possible. The use of more sensors 2 may be required for such a configuration. In which case, their signals would be also combined.

Figure 3:
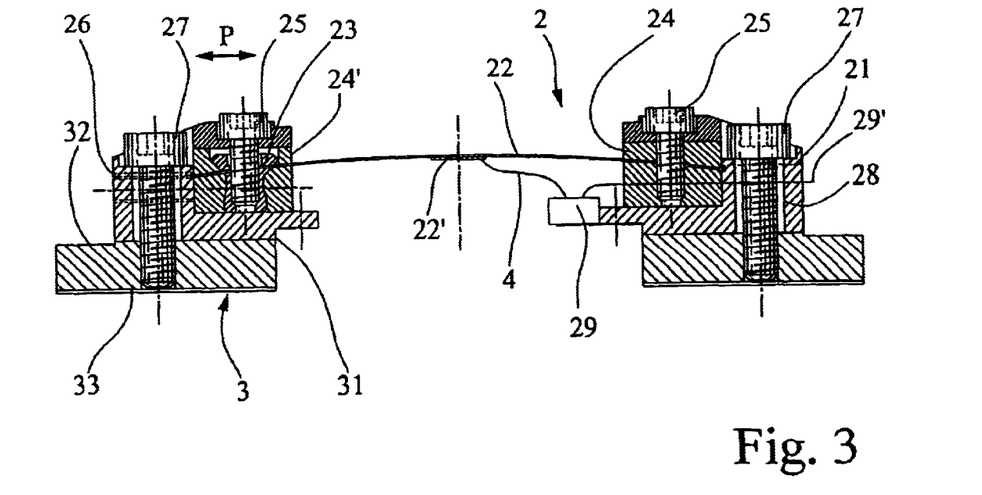
FIG. 3 shows a longitudinal cross-sectional view of a sensor of the device of the invention.
Figure 4:
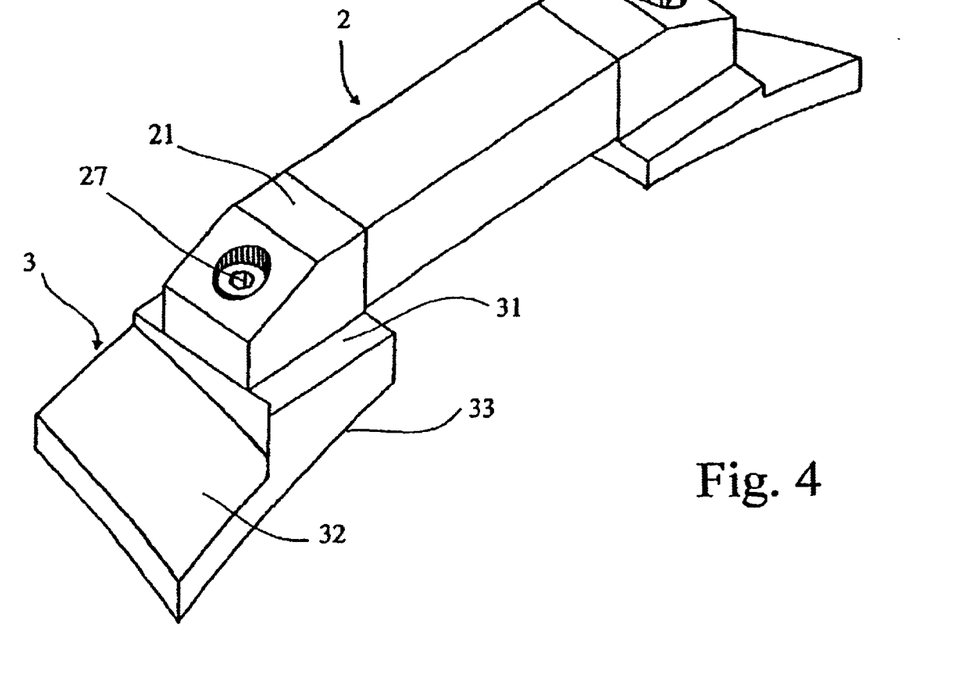
FIG. 4 shows a perspective view of the sensor shown in FIG. 3.

Referring more particularly to FIGS. 3 and 4, a specific form of deformation sensor 2 is shown. It is important to note that any other type of measurement sensor would be suitable, such as those sensors already existing commercially. The sensor 2 as shown, comprises two contacts 21 between which is mounted a pretensioned blade 22 having sensing element 22' thereon made of for example, a resistive, capacitive, or piezoelectric gauge or any other equivalent sensing means, installed using a vacuum manufacturing method similar to that used for integrated circuits. This sensing element 22' is linked by electric wires or other electrical transmission means 4, to an electric box 29 mounted on one of the contacts 21, the electric box for example comprising the conditioner 5, the transmitter 6, the calculator 7 and an output wire 29' which directs an output signal to a remote display not shown.

The pretensioned blade 22 is jointly fixed between contacts 21, via safety jaws 24 and 24'. They comprise at their extremities a hole permitting a retention screw 25 to pass therethrough and which also passes through a smooth corresponding hole in the contacts, and is screwed into the safety jaws 24, 24'. The safety jaws 24 and 24' comprise a slot for receiving the corresponding extremities of the pretensioned blade 22. One of the safety jaws 24 is permanently fixed and the other can be translated following arrow P due to the adjustment means. The adjustment means comprise an adjustment screw 26 parallel to the pretension blade 22 and which extends through a smooth hole in the corresponding contact 21 and is screwed into the safety jaw 24' in order to permit precise adjustment of its position in the direction of the blade and, as a result, permits adjustment of the pretension force exerted on the blade 22. The extremity of the corresponding pretension blade 22 is fixed in the safety jaw 24' by an intermediate screw 23 which is engaged by the fixation screw 25. The corresponding contact 21 comprises an oblong hole to permit the fixation screw 25 to pass therethrough, thereby permitting the adjustment.

The construction and assembly of each sensor 2 is made in a laboratory by qualified personnel with the precaution and precision necessary to obtain very precise and time reliable sensors 2. This type of assembly could never be done in a workshop directly to the test piece 1. Following assembly, the central portion of sensor 2 containing said blade 22 and its sensor element 22', or the entire sensor 2, is either molded in synthetic material intended to protect the sensor from external damage, or covered by an adequately sized container.

The sensor 2 thus obtained can then be mounted with ease to the part 1 either directly, using intermediary fastening members 3 comprising anchoring contacts, having a top face 31, a end face 32 and a bottom face 33 shaped to conform to the part 1. In this case, the contacts 21 of the sensor 2 are positioned on the top face 31 of the anchoring contacts 3 and are engaged using fixation screws 27 which extend through a smooth bore 28 provided in said contacts 21. These smooth bores 28 can be oblong holes which permit an additional adjustment between the two anchoring points A and B. The planes 31 provided on the anchoring contacts 3 define a perfectly flat surface which permits the assembly of said sensor 2. These anchoring contacts 3 are then fixed directly to the test part 1, generally by gluing, welding, screwing or using any other. appropriate fastening means. The shape of the bottom face 33 of said anchoring contacts 3 is conformed to the shape of the part 1 either by machining, plastic deformation or direct molding onto the part 1 for. the most complicated cases. In the case shown in FIG. 6, for example, the anchoring contacts 3 can simply be done by square punching holes in a tube in the correct orientation. The attachment of the sensor 2 to the anchoring contacts 3 by screws 27 permits the sensor to be easily disassembled. The anchoring contacts 3, located at the fixation point of the sensor 2 on the part 1, are very unlikely to deform. As a result, attaching the sensors using glue is very reliable.

Figure 5:
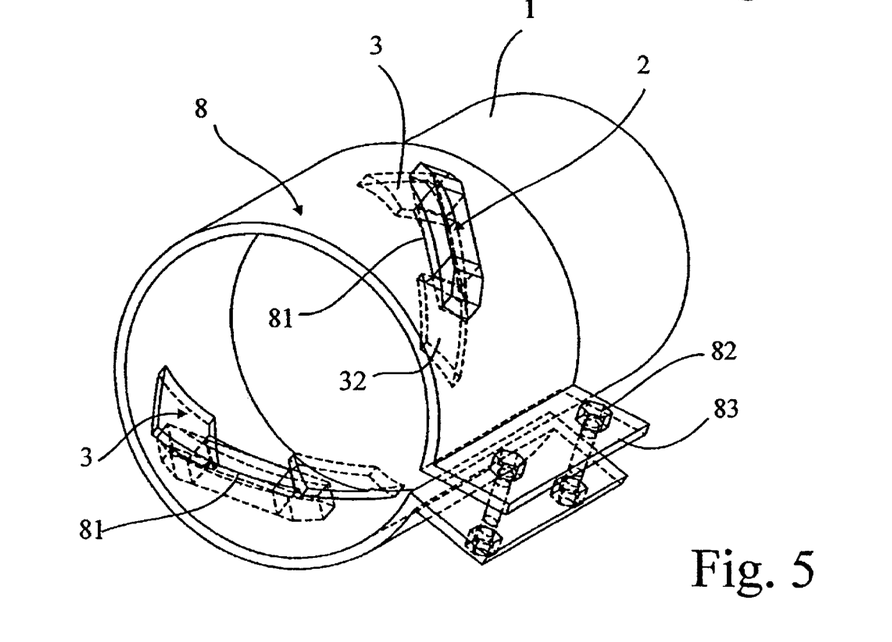
FIG. 5 shows an example of the mounting of the sensor of FIG. 3, FIGS. 6 through 8 show possible installation arrangements of sensors of the device of the invention.

To assemble the anchoring contacts 3 and to precisely position the measurement sensors 2 on the part under test 1, a template 8 as shown in FIG. 5 is used, part 1 being shortened voluntarily. The template 8 is comprised for example of a clamping collar having a shape adopted to conform of that of part 1. It is clamped to part 1 using screws 82 or any other appropriate fastening means capable of tightening together tabs 83, thereby enclosing and fixing in place the anchoring contacts 3 using the corresponding ends 32 during the gluing stage. The template 8 also comprises cells 81 which center the sensors 2 in a position determined either by previous trials or by calculation. The template 8 is removed once the gluing stage is concluded.

Figure 6:
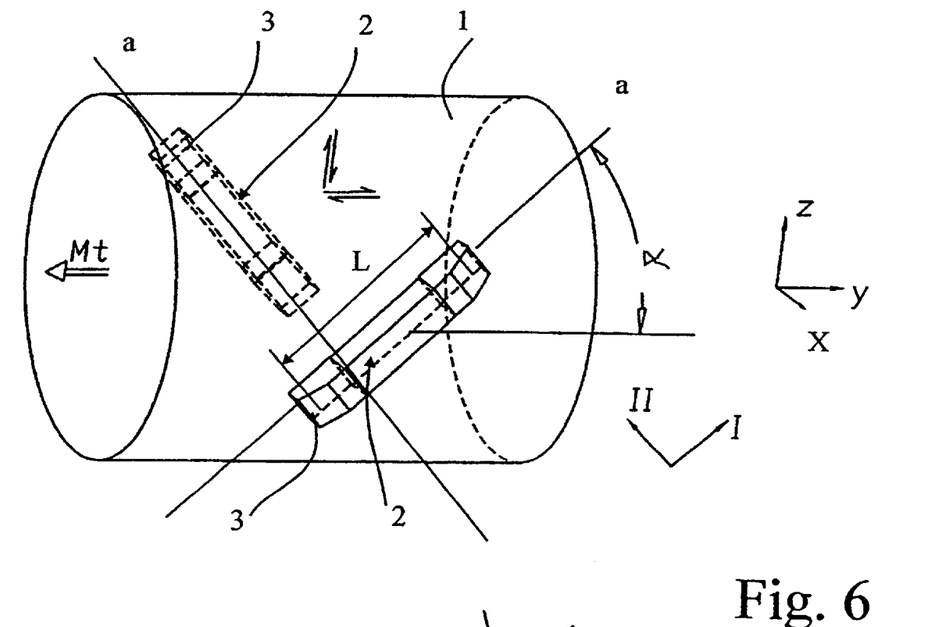
Figure 7:
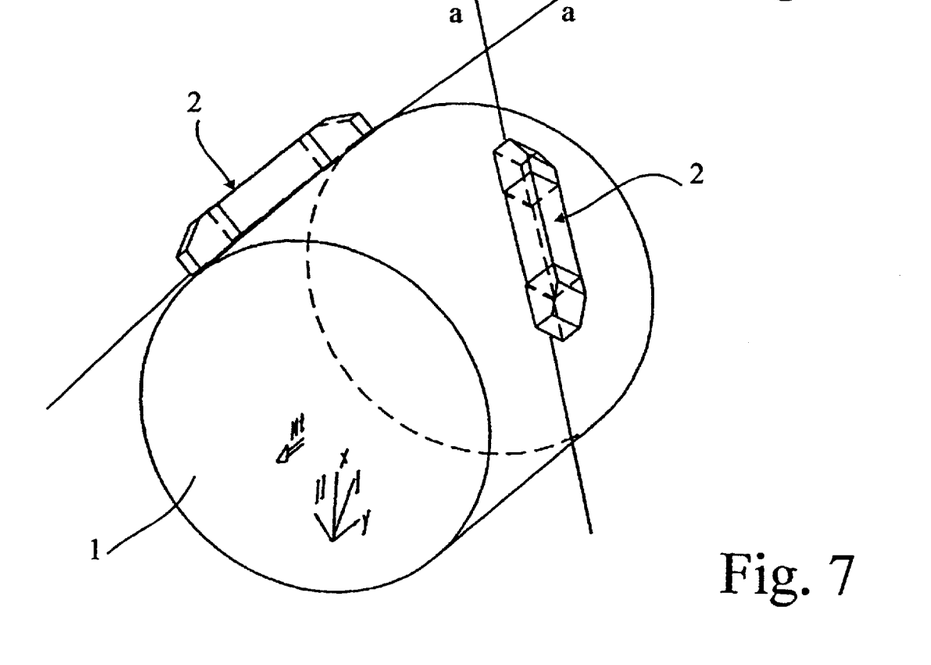
Figure 8:
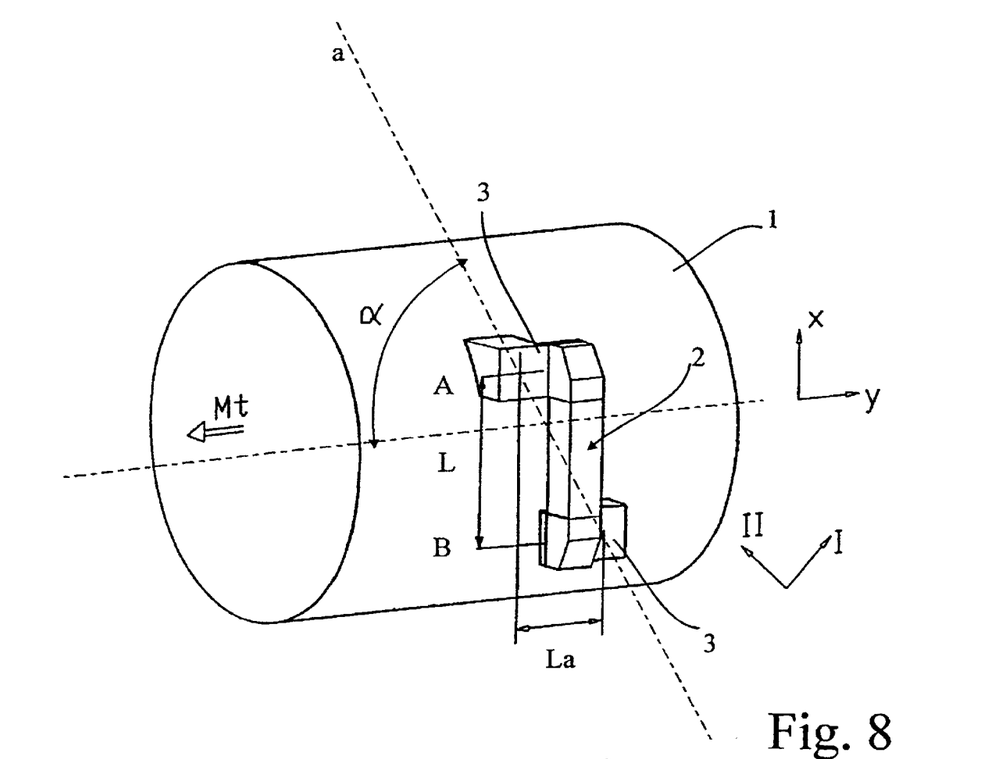

Depending on the shape of the test part 1, the forces to which it is subjected and the results of the tests required, the two measurement sensors 2 can be arranged in various combinations as shown in FIGS. 6 to 8.

In FIG. 6, the sensors 2 are diametrically opposite one another and oriented along two curves (a) of part 1, which are parallel and form an angle α with the axis of symmetry of the part. In this arrangement, the angle α is equal to 45° according to the explanations which follow. However, it can vary between 0 and 90°, but cannot be either of these two limits. In fact, for α=0, or α=90°, the sensitivity of the sensor under torsion is useless as shear cannot be measured with this arrangement.

In FIG. 7, the two sensors 2 are not diametrically opposite but are located on one side of the neutral axis of the part 1 and are symmetric with respect to a plane passing through the axis of the part, each sensor oriented along a curve (a) of the part 1 which form an angle α with the axis of symmetry of the part, and the two curves (a) intersecting one another. The angle α can also be equal to 45° or be varied according to needs.

In FIG. 8, the sensors 2 are arranged perpendicularly with respect to the axis of symmetry of the part 1 and the anchoring contacts 3 are spaced apart by a distance $L_a$. Accordingly, the anchoring points A and B of each sensor 2 are also positioned along the two curves (a) which are parallel to one another and inclined with respect to the axis of part 1 by an angle α.

Recalling that for a mechanical part 1 subject to bending forces Fx and Fz and their corresponding moments Mx and Mz and to a torsion moment My associated with force Fy, the force tensor of such a system in a trigonometric coordinate system is:

Fx Fy Fz
Mx My Mz

FIG. 6 shows a sensor arrangement which permits the best measurement of torsion moment My. The moment My can be represented by a constraint matrix for a point on the surface, in the xy reference plane, of the form $$\begin{vmatrix} 0 & \tau \\ \tau & 0 \end{vmatrix},$$

where τ represents a shear. By diagonalization, this matrix takes the form $$\begin{vmatrix} \sigma I & 0 \\ 0 & \sigma II \end{vmatrix}$$

where σI and σII represent the normal principal constraints in plane I, II, rotated by 45° with respect to the initial xy reference plane, with σII=−σI and |σI,II|=τ. The deformation matrix is, similarly $$\begin{vmatrix} \varepsilon I & 0 \\ 0 & \varepsilon II = -\varepsilon I \end{vmatrix}$$

following I and II, εI and εII representing the principal deformations. Consequently, two adjacent elements oriented according to these directions will undergo no relative translation. Effectively, throughout the length of the part 1, a helix inclined 45° with respect to the axis of said part or the axis of moment My represents an isobar, sometimes also called a line of force and corresponds to curves (a). A measurement sensor 2 anchored between the two points A and B in a direction 45° with respect to the axis of moment My will therefore:

have its extremities deformed exactly along its longitudinal axis, with the exception of any relative rotation of the part 1. The sensor 2 therefore is subjected to less interference effects.

have a maximum elongation ΔL of its anchoring points A and B for any given moment My and given distance AB. The sensitivity with respect to the torsion moment My will therefore be maximized.

In the case where measurement sensors 2 are arranged along curves (a) whose inclination angles α are not 45°, the value read by the sensor will represent part of that read in the aforementioned case, corresponding to the projection of the preceding elongation ΔL on the sensor axis. The sensor is less sensitive to torsion and more sensitive to deformation interference, as well as to other components of the force tensor. The arrangement can be used when that of FIG. 6 is impossible due to space consideration, and/or if the sensor used is not very sensitive to interference deformations, or if sensitivity to another component of the force tensor is desired, for example, to extract the force on a wheel shaft using a combination of the sensor signals in an electric circuit such as that illustrated in FIG. 11B.

FIG. 8 shows an alternate arrangement of sensor 2, where the sensor is oriented 90° with respect to the axis of the torsion moment My, the anchoring contacts 3 being spaced apart by a distance of $L_a$ perpendicularly to the axis of the sensor. The sensor 2 measures a proportional elongation of the distance $L_a$ and the relative rotation of adjacent sections of part 1 due to the torsion moment My. A value representative of the shear is therefore measured. This arrangement can be used when geometrical constraints do not permit to use the arrangement shown in FIG. 6, or when one wants to increase or decrease the elongation ΔL to measure in order to adapt it to the measurement range of the sensor. In FIG. 6, which is the schematic of the base installation of the device having two diametrically opposite measurement sensors 2 and anchoring contacts 3, the torsion "lines of force" are schematically shown corresponding to curves (a), along which the sensors are glued. The two sensors therefore measure deformations equal in magnitude and of the same sign.

Figure 9A:
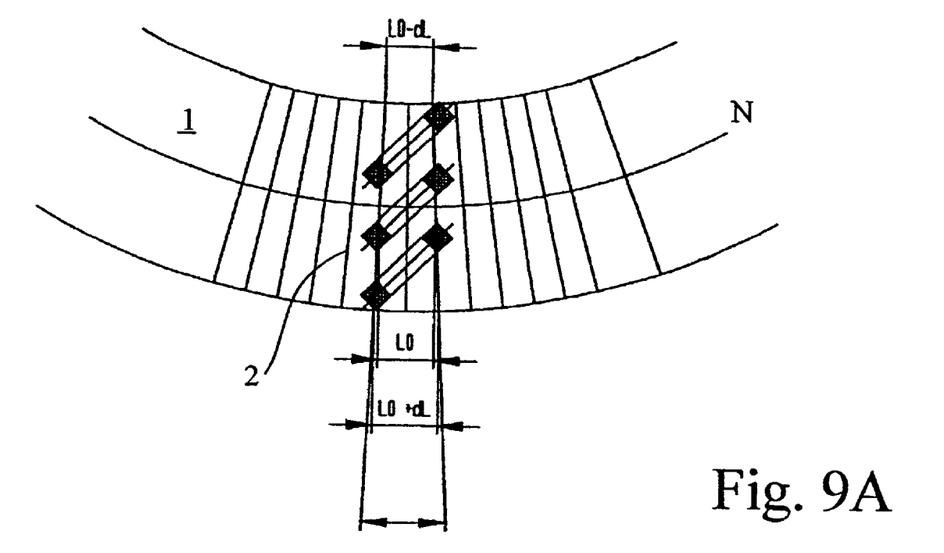
FIGS. 9A and 9B show deformations in a part subjected to bending moment and shear force, respectively.
Figure 9B:
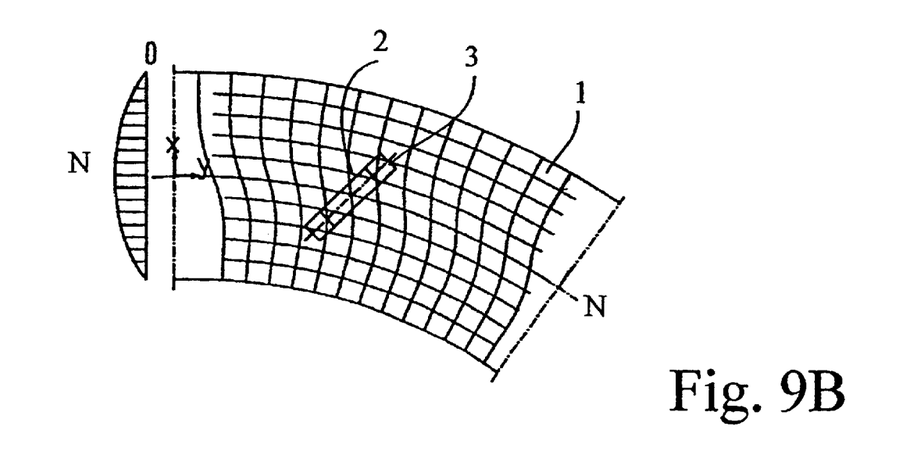

FIG. 9A shows displacements measured by the sensors when subjected to a pure bending moment. The sensor 2 undergoes a linear compression D−d or an elongation D+d, depending on whether it is located above or below the neutral axis N, while the anchoring contacts 3 undergo a rotation φ. FIG. 9B shows the deformations in a section of part 1 subjected to a shear force. Examining a transverse cross section, it is apparent that this section does not remain in the same plane after deformation, in contrast to the effect of pure bending, as a result of shear in the direction x. Additionally, a relative translation occurs between two adjacent sections. This shear is not evenly distributed throughout a section, but at a maximum at the neutral axis N. Real life cases of bending are often a combination of the cases 9A and 9B.

FIGS. 10A through 10D show polar signal diagrams from a sensor 2 mounted on a part 1 subjected to bending forces according to its angular position on said part 1. The maximum signal is recorded at 90° from the neutral axis N of part 1, and the minimal signal along the neutral axis N.

Figure 10A:
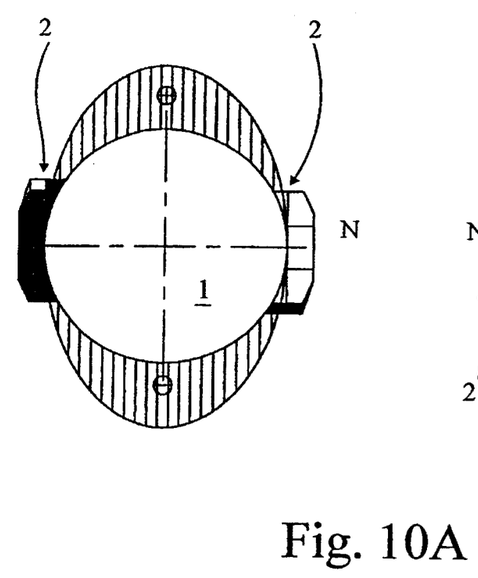
FIGS. 10A through 10D show polar diagrams of the signal obtained from sensors of the device of the invention according to various orientational arrangements.

FIG. 10A corresponds to the case wherein the two sensors 2 are diametrically opposite, arranged along the neutral axis N and oriented at 45° as shown in FIG. 6. One should record very weak or non-existent signals. However these sensors are not symmetric with respect to the bending forces and, as a result of the phenomenon described with respect to FIGS.

5A and 5B and because the sensors have a non-negligible length, a large uncertainty of the value and sign of the measured deformation ΔL results, making elimination of the bending load signal quite random.

Figure 10B:
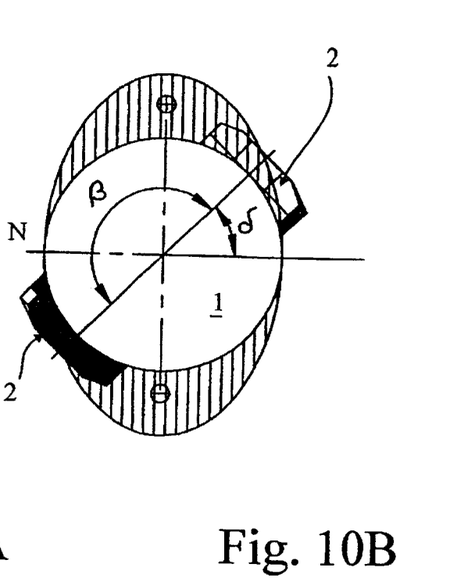

FIG. 10B corresponds to the case where the two sensors 2 are oriented at an angle δ with respect to the neutral axis N (δ≧30°) and are diametrically opposite one another, the angle β being equal to 180°. This angular spacing permits the sensors to provide with certainty signals having opposite signs capable of being combined according to the electric circuit schematic illustrated in FIG. 11A in an attempt to eliminate the measured bending forces, with eventual examination of each sensor if the polar diagram dissymmetry requires it.

The resulting measurements often show a significant dissymmetry in the bending diagram between the zones under traction (represented by the + sign) and the zones under compression (represented by the − sign ). It is also possible, in the case of braking, in particular, that one of the components Fx or Fz is variable, therefore modifying the orientation of the resultant creating the bending load and therefore modifying the polar diagram.

Figure 10C:
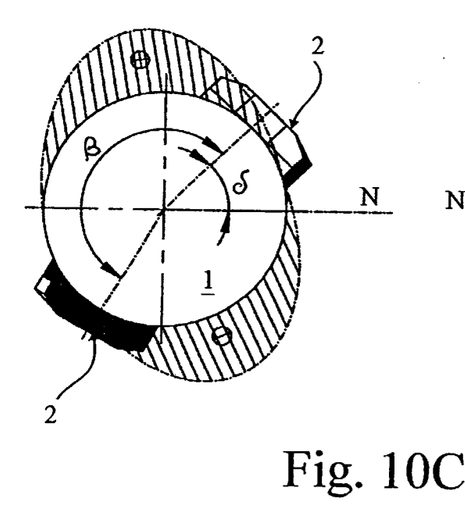

In this case, as illustrated in FIG. 10C, one can move one of the two sensors 2 such that the angle β be not 180°. The angles δ and β are determined by calculation and/or prior tests in order to achieve the best possible combination of the signals having opposing signs for all operating conditions.

Figure 10D:
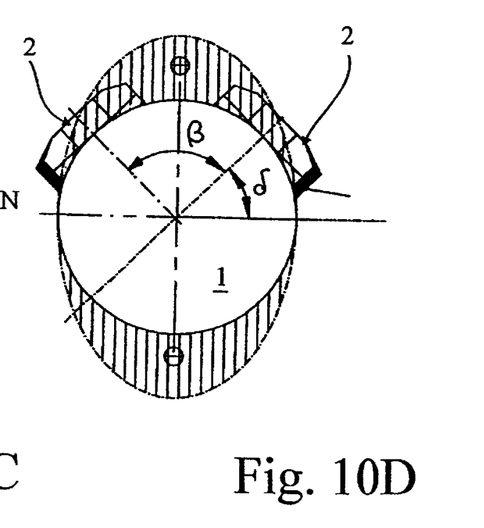

FIG. 10D corresponds to an alternate arrangement of the sensors 2 as illustrated in FIG. 7. In contrast to FIG. 6, the sensors 2 are arranged along the torsion lines of force of opposite sign. Projecting these lines, they no longer appear to perpendicularly intersect but are parallel. The angles δ and β are defined such that the sensors 2 are located on the same side of the neutral axis, the angle β being about 90°. The combination of signals in this case would follow the electronic circuit schematic illustrated in FIG. 11B. In this case, two torsion signals having opposite signs and two bending signals having the same signs are subtracted.

$$My-(-My)+F-F=2My$$

The advantage of this arrangement is the ability to eliminate tension force Fy and especially thermal dilation Δ whose effects are identical on the two sensors.

$$My-(-My)+Fx-Fx+Fz-Fz+Fy-Fy+\Delta-\Delta=2My$$

The use of self-compensating sensors can therefore be avoided.

Figure 11A:
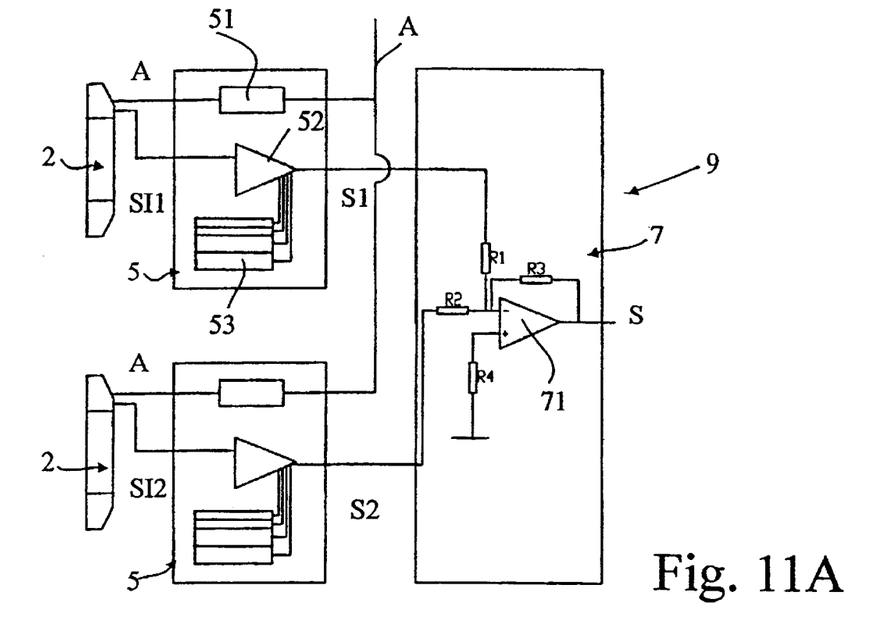
FIGS. 11A and 11B show two examples of the electronic circuit used with said sensors of the device of the invention, permitting two different combinations of signals.

FIG. 11A illustrates an example of an electronic circuit 9 which permits the conditioning and combination of the signals produced from the arrangements of said measurement sensors as illustrated in FIGS. 1, 6 and 8. The electronic circuit 9 comprises two sensors 2 electrically powered by a power supply A and each delivering a signal SI1, SI2, a signal conditioner 5 corresponding to each sensor 2 and each delivering an output signal SI1, SI2, and a calculator 7 which, in this case, is an analog adder but which could equally be replaced by a digital calculator.

The signal conditioner 5, or gauge bridge conditioner, comprises a voltage supply regulator of the bridge 51, an instrumentation operational amplifier 52 and a calibration and temperature correction device 53. These conditioning effects can be achieved either mechanically, or using analog or digital instrumentations. Both digital and analog circuits exist which can perform the functions 51 to 53.

The adder 7 comprises four resistors R1, R2, R3, R4 and a differential amplifier 71 which produces an output signal S as a function of input signals S1 and S2 according to the following formula:

$$S = -\left(\frac{R3*S2}{R2} + \frac{R3*S1}{R1}\right),$$

If the bending polar diagram is symmetric, R1=R2=R3 is sufficient to completely eliminate bending and to keep the signal proportional to the torsion moment. In the other case, the resistor values are varied as necessary to completely eliminate the bending signal.

FIG. 11A shows the most general arrangement having a separate conditioner for each measurement sensor 2. Naturally, it is possible to simplify or to combine the conditioners of the two sensors.

Figure 11B:
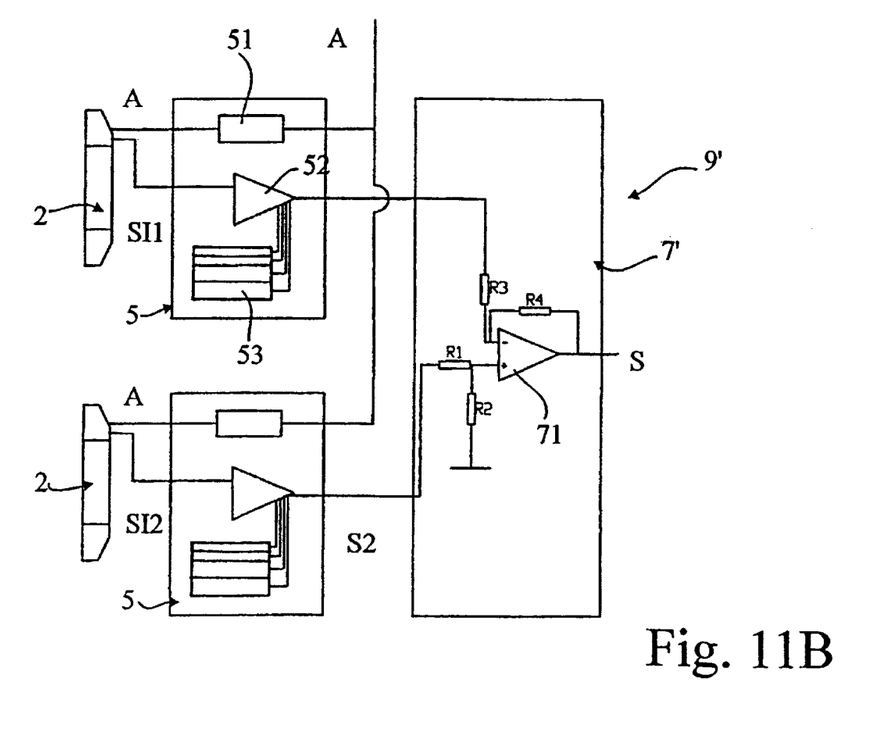

FIG. 11B shows electronic circuit 9' which permits conditioning and combining these signals for the arrangements as illustrated in FIG. 7. It can also be used for an assembly of the type represented in FIG. 10B, and when, during periods when the vehicle is not braking, measurement of the components of force exerted on the instrumented wheel shaft is wanted. It comprises, other than the two sensors 2 and the signal conditioners 5, a calculator 7' which is a substractor and can be analog as shown or digital. The output signal S corresponds to the following formula:

$$S = -\frac{R3}{R4}S2 + \frac{R2(R3+R4)}{R4(R1+R2)}S1,$$

and $$S2=-aMy+bFx+cFz+Fy+\Delta.$$

The following is therefore obtained in the case of FIG. 7:

$$My-(-My)+Fx-Fx+Fz-Fz+Fy-Fy+\Delta-\Delta=2My, \text{ if } R1=R2=R3=R4.$$

And for the case as shown in FIG. 10B:

$$My-My+Fz+Fz=2Fz$$

When part 1 has both symmetric behavior and geometry, applying a bending force generates a change in the distance between anchoring points A and B of the measurement sensors 2 fixed to the part 1. This distance increases for one of the sensors and decreases for the other. If the part 1 is perfectly symmetric, the absolute value of this displacement is the same for each of the two sensors. When the two signals produced by the sensors are added, a signal which does not vary as a function of the applied force is obtained. If a minor dissymmetry in part 1 exists, each signal can be weighted in order to obtain a constant signal as a function of the applied bending force.

When part 1 has a symmetrical behavior and geometry, applying a torque also generates a variation in the distance between the anchoring points A and B of the measurement sensors 2 fixed to the part 1. This variation is of the same direction for both sensors. When the signals are added, weighted or not, the signal obtained is representative of the torque My applied to the part 1.

The present invention applies principally to braking devices for all types of vehicles: automobiles, trucks, railway vehicles, planes, as well as rotating machines in order to provide monitoring, control and regulation of the brakes, and additionally control of the parts themselves.

For these particular applications, the vehicle wheel axles are submitted to complex and large forces, due to the weight of the vehicle as well as the braking force. The interference forces (such as tension) can sometimes be as significant as the torsional effects measured. It follows that the torsion sensors must live up to rigorous demands, wherein the essential requirements are as follows:

a sensor precision of at least 5%;

a sensor size of only several cubed centimeters as the available space is often limited and the access difficult;

the sensor being very easily mounted and disassembled without requiring disassembly of the surrounding parts, such as wheels, and without the addition of complex accessories for sensor fixation;

a sensor pass band of a few kilo-hertz such that it is not affected by a large range of mechanical vibrations;

the capability of pre-adjusting and adjusting the sensor after assembly to precisely control its operation point;

thermal self-compensation permitting insensitivity to temperature variations;

capable of being mass produced at low cost with perfect repeatability.

It is not limited to the examples described but can be applied to any modification and obvious variants for a man skilled in the art, while remaining within the scope of protection defined by the appended claims.

What is claimed is:

1. Method for measuring at least one component of a force tensor applied to a part (1), having an axis of symmetry and defined as follows in a trigonometric coordinate system:

Fx Fy Fz

Mx My Mz, wherein Fx and Fz are bending forces in an X and Z direction having corresponding moments Mx and Mz and My is a torsion moment associated with force Fy. the method requiring affixing at least two identical deformation measurement sensors (2) to said part (1), each being engaged between two distinct anchoring points (A, B) using fastening members (3) designed to transmit to said sensors (2) deformations of said part (1), a deformation of said fastening members (3) being negligible with respect to that of said part, said sensors (2) being designed to produce an electric signals as a function of a change in distance between said respective anchoring points (A, B) caused by said deformations; electrically conditioning signals from said sensors (2), said conditioning depending on said sensors (2); and combining said signals to deduct a value of said force tensor component, characterized in that the two distinct anchoring points (A, B) of each sensor (2) are placed on a surface of the part (1), such that the two lines (a) passing respectively through the two distinct anchoring points (A, B) of each sensor, carried to the surface of the part are substantially parallel and form a line parallel to the axis of symmetry of the part going through one of said anchoring points, forming an angle α greater than 0 degrees and smaller than 90 degrees.

2. A method according to claim 1, characterized in that said angle α is preferably equal to 45°.

3. A method according to claim 1, characterized in that said sensors (2) are diametrically oppositely arranged to one another on said part (1).

4. A device for measuring at least one component of a force tensor applied to a part (1) having an axis of symmetry and defined as follows in a trigonometric coordinate system:

Fx Fy Fz

Mx My Mz wherein Fx and Fz are bending forces in an X and Z direction having corresponding moments Mx and Mz and My is a torsion moment associated with force Fy, capable of the implementation of a measurement method, said device comprising at least two identical deformation measurement sensors (2), each being mounted between two distinct anchoring points (A, B) and fixed to said part (1) using fastening members (3) designed to transmit to said sensors (2) deformations of said part (1), said sensors (2) being designed to produce electric signals as a function of changes in a distance between said respective anchoring points (A, B) generated by said deformations, an electronic circuit comprising an electronic signal conditioner at the output of said sensors (2), said signal conditioner being specifically associated with said sensors (2), and a calculator capable of integrating said signals in order to deduct a value of said force tensor component, each sensor (2) comprising two contacts (21) spaced apart (1) by an interval equivalent to said distance between said anchoring points (A, B) and a pretensioned blade (22) fixed at its extremities in said contacts (21) and having at least a sensible (22') element thereon, characterized in that at least one of said contacts (21) comprises regulation means designed to adjust the pretension on said blade (22).

5. A device according to claim 4, characterized in that said contacts (21) each comprise a safety jaw (24, 24') equipped with a slot for receiving the corresponding extremities of said pretensioned blade (22) and fixed in said contacts (21) by a fixation screw, and in that said regulation means comprise a regulation screw engaged with at least one of said safety jaw (24') to adjust its position in a direction of said pretensioned blade (22).

6. A device according to claim 5, characterized in that said fastening members comprise anchoring contacts (21), each of said anchoring contacts (21) comprising a top face (31) jointly fixed to a sensor (2) contact and a bottom face (33) having a shape adapted to conform to said part (1) and being jointly fixed thereto.

7. A device according to claim 6, characterized in that said sensor (2) contact is fixed to said corresponding anchoring contacts (21) using a removable fixation member (27).

8. A device according to claim 6, characterized in that said anchoring contacts (21) are affixed to said part (1) using a fixation technique selected from the group consisting of gluing, welding, screwing, molding.

9. A device according to claim 6, characterized in that said anchoring points (A, B) are made of a rigid, non-deformable material.

10. A device according to claim 4, characterized in that said calculator is chosen as a function of the arrangement of said sensors (2) on said part (1), said calculator being one of analog and digital, and chosen from the group consisting of an adder and a subtractor.

* * * * *